United States Patent
Kobayashi et al.

(10) Patent No.: US 8,831,871 B2
(45) Date of Patent: Sep. 9, 2014

(54) COMMUNICATION SYSTEM, COMMUNICATION APPARATUS, COMMUNICATION METHOD, AND COMMUNICATION PROGRAM

(75) Inventors: Hirokazu Kobayashi, Osaka (JP); Shinichi Sawada, Osaka (JP); Shusaku Fukumoto, Osaka (JP); Katsutoshi Ishikura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 149 days.

(21) Appl. No.: 13/505,991

(22) PCT Filed: Oct. 14, 2010

(86) PCT No.: PCT/JP2010/068071
§ 371 (c)(1),
(2), (4) Date: May 3, 2012

(87) PCT Pub. No.: WO2011/055619
PCT Pub. Date: May 12, 2011

(65) Prior Publication Data
US 2012/0221245 A1    Aug. 30, 2012

(30) Foreign Application Priority Data

Nov. 5, 2009 (JP) ................ P2009-254171

(51) Int. Cl.
| | | |
|---|---|---|
| G01C 21/00 | (2006.01) | |
| G01C 22/00 | (2006.01) | |
| G08G 1/123 | (2006.01) | |
| B61L 15/00 | (2006.01) | |
| G08G 1/005 | (2006.01) | |
| H04W 64/00 | (2009.01) | |
| H04W 4/02 | (2009.01) | |
| B61L 25/02 | (2006.01) | |
| G08G 1/00 | (2006.01) | |
| G01C 21/36 | (2006.01) | |
| G01C 21/20 | (2006.01) | |
| H04M 3/436 | (2006.01) | |
| G01S 19/14 | (2010.01) | |

(52) U.S. Cl.
CPC .......... *H04W 64/00* (2013.01); *B61L 15/0072* (2013.01); *G08G 1/005* (2013.01); *H04M 3/436* (2013.01); *G01S 19/14* (2013.01); *H04W 4/021* (2013.01); *H04M 2242/30* (2013.01); *B61L 25/025* (2013.01); *G08G 1/207* (2013.01); *G01C 21/3626* (2013.01); *G01C 21/20* (2013.01)
USPC ......................................... 701/408; 340/988

(58) Field of Classification Search
USPC ......... 701/400, 408–412, 424–425, 468–470, 701/422; 340/988
See application file for complete search history.

(56) References Cited

U.S. PATENT DOCUMENTS

| | | | |
|---|---|---|---|
| 8,204,684 B2 * | 6/2012 | Forstall et al. ................ | 701/433 |
| 2004/0002303 A1 | 1/2004 | Hirokawa | |
| 2006/0089797 A1 | 4/2006 | Suzuki et al. | |
| 2010/0318621 A1 | 12/2010 | Aono et al. | |

FOREIGN PATENT DOCUMENTS

| | | |
|---|---|---|
| EP | 1 679 488 A1 | 7/2006 |
| JP | 2005-127855 A | 5/2005 |
| JP | 2006-153695 A | 6/2006 |
| JP | 2009-177697 A | 8/2009 |
| WO | WO 2009/069744 A1 | 6/2009 |

* cited by examiner

*Primary Examiner* — Yonel Beaulieu
(74) *Attorney, Agent, or Firm* — Birch, Stewart, Kolasch & Birch, LLP

(57) ABSTRACT

A position measuring unit measures a position. An area determining unit determines a means of movement. A position measurement result transmission determining unit determines, based on the means of movement determined by the area determining unit, whether or not to transmit the position measurement result of the position measuring unit to the information-providing apparatus. A transmitting unit transmits, in the case in which the position measurement result transmission determining unit determines to transmit the position measurement result to the information-providing apparatus, the position measurement result to the information-providing apparatus.

20 Claims, 8 Drawing Sheets

FIG. 3

| SERVICE | INFORMATION-PROVIDING APPARATUS | STR FLAG | ICR FLAG |
|---|---|---|---|
| SERVICE A | E11 | 1 | 0 |
| SERVICE B | E12 | 0 | 1 |
| SERVICE C | E13 | 1 | 0 |
| SERVICE D | E14 | 0 | 0 |
| SERVICE E | E15 | 0 | 0 |
| ... | ... | ... | ... |

FIG. 7

| SPEED OF MOVEMENT | SPEED CLASSIFICATION | REMARKS |
|---|---|---|
| 5 KM/H OR LOWER | LOW SPEED | DETERMINED TO BE WALKING |
| 6 TO 69 KM/H | MEDIUM SPEED | MOVING ON GENERAL ROADS IN A CAR; RIDING A TRAIN |
| 70 KM/H OR HIGHER | HIGH SPEED | MOVING ON HIGHWAY OR ON A SHINKANSEN |

FIG. 8

| SERVICE | INFORMATION-PROVIDING APPARATUS | SPEED CLASSIFICATION | REMARKS |
|---|---|---|---|
| SERVICE A | E11 | LOW SPEED | INFORMATION FOR WALKING |
| SERVICE B | E12 | LOW SPEED | INFORMATION FOR WALKING |
| SERVICE C | E13 | LOW SPEED | INFORMATION FOR WALKING |
| SERVICE D | E14 | MEDIUM SPEED | STATION INFORMATION |
| SERVICE E | E15 | HIGH SPEED | HIGHWAY INFORMATION |
| ... | ... | ... | ... |

COMMUNICATION SYSTEM, COMMUNICATION APPARATUS, COMMUNICATION METHOD, AND COMMUNICATION PROGRAM

TECHNICAL FIELD

The present invention relates to a communication system, a communication apparatus, a communication method, and a communication program.

The present application claims priority based on the patent application No. 2009-254171 filed in Japan on Nov. 5, 2009 and incorporates by reference herein the content thereof.

BACKGROUND ART

In recent years, communication apparatuses having a GPS (Global Positioning System) function, such as car navigation systems and mobile telephone devices have come into widespread use. With the widespread use of such communication apparatuses, investigations are undertaken with regard to technology for reducing the power consumption of such communication apparatuses.

For example, in Patent Reference 1, there is language regarding, when performing periodic position measurement when under a condition in which a mobile telephone is positioned within the cell of a base station apparatus, the lengthening the position measurement interval in the case in which a determination is made that it is stationary within the cell, and the shortening the position measurement interval in the case in which a determination is made that it has moved to a different cell.

In Patent Reference 2, there is language regarding the disconnecting of communication with a GPS server when it is not possible to obtain a position measurement result.

Recently, information-providing services using the GPS function have come to be provided. Specifically, a communication apparatus such as in car navigation or a mobile telephone measures the current position using the GPS function and transmits the position measurement result to an information-providing apparatus. The information-providing apparatus transmits information to the communication apparatus that is selected based on the received position measurement result. The communication apparatus displays the information received from the information-providing apparatus.

For example, the communication apparatus transmits a position measurement result to an information-providing apparatus that controls road traffic information, an information-providing apparatus that controls railway traffic information, or the like. Each of the information-providing apparatuses, in the case in which the position of the communication apparatus, which is shown by the position measurement result, is included within some area (such as a tourist location), transmits information regarding that area (tourist guide information, shop information, traffic information, and the like) to the communication apparatus.

PRIOR ART DOCUMENTS

Patent Documents

Patent Reference 1: Japanese Patent Application Publication No. JPA 2006-153695
Patent Reference 2: Japanese Patent Application Publication No. JPA 2005-127855

DISCLOSURE OF INVENTION

Problem to be Solved by the Invention

In a conventional information-providing service using the GPS function, each time the communication apparatus transmits the position measurement result to each base station apparatus, information regarding the area in which the position of the communication apparatus is included is transmitted by each of the information-providing apparatuses. For this reason, there is the shortcoming that, for example, even if the user of the communication apparatus is moving by railway, the communication apparatus receives and displays information regarding shops along a road, information regarding parking lots, and the like.

In this manner, there was the shortcoming that, in a conventional information-providing service that used the GPS function, the communication apparatus would receive information that is unnecessary to the user.

The present invention was made in consideration of the above-noted point and provides, in an information-providing service that uses a position measuring function, a communication system, a communication apparatus, a communication method, and a communication program capable of preventing the reception by the communication apparatus of information unnecessary to the user.

(1) The present invention was made to solve the above-noted problem, a first aspect of the present invention is a communication system including a communication apparatus that transmits a position measurement result, and an information-providing apparatus that selects and transmits to the communication apparatus information regarding an area based on the position measurement result received from the communication apparatus, wherein the communication apparatus including: a position measuring unit that measures a position; a means of movement determining unit that determines a means of movement; a position measurement result transmission determining unit that, based on the means of movement determined by the means of movement determining unit, determines whether or not to transmit the position measurement result of the position measuring unit to the information-providing apparatus; and a transmitting unit that, in the case in which the position measurement result transmission determining unit determines to transmit the position measurement result to the information-providing apparatus, transmits the position measurement result to the information-providing apparatus.

According to the above-noted constitution, because in the communication system a determination is made by the communication apparatus regarding whether or not to transmit the position measurement result to the information-providing apparatus based on the means of movement, it is possible to prevent the transmission of the position measurement result to the information-providing apparatus that transmits information not relevant to the means of movement. By doing this, it is possible to prevent the reception from an information-providing apparatus of information not relevant to the means of movement, that is, to prevent the reception of information unnecessary to the user. Also, by preventing such reception, the communication apparatus can prevent the electrical power consumption required in reception, and prevent the consumption of storage area to store received data.

(2) In the first aspect of the present invention, the position measurement result transmission determining unit may determine not to transmit the position measurement result to the information-providing apparatuses that transmits information not relevant to the means of movement determined by the means of movement determining unit. By the above-described configurations, in the communication system, it is possible for the communication apparatus to prevent from sending the measurement result to the information-providing apparatuses which send the information not relevant to the means of movement. By doing this, the communication apparatus can prevent the reception from an information-providing apparatus of information not relevant to the means of movement, that is, prevent the reception of information unnecessary to the user.

(3) In the first aspect of the present invention, the means of movement determining unit may determine the means of movement based on its own position area.

(4) In the first aspect of the present invention, the communication system may include a navigation apparatus that measures the position and the means of movement determining unit may determine the means of movement based on the position information input from the navigation apparatus.

(5) In the first aspect of the present invention, the communication system may include a gate apparatus that controls exit and entry of the means of movement, and the means of movement determining unit may determine the means of movement based on information showing entry and exit received from the gate apparatus.

According to the above-noted constitution, in the communication system, because a determination regarding the means of movement is made by the communication apparatus based on information indicating entry and exit received from a gate apparatus, it is possible to reliably determine the means of movement.

(6) In the first aspect of the present invention, the means of movement determining unit may determine whether or not the means of movement is moving on a highway and the position measurement result transmission determining unit may determine not to transmit the position measurement result by the position measuring unit to the information-providing apparatuses that transmits information not relevant to the highway in the case in which the means of movement determining unit determines movement to be by highway.

According to the above-noted constitution, in the communication system, in the case in which the determination is made that movement is by highway, the communication apparatus makes the determination not to transmit positioning information to an information-providing apparatus that transmits information not relevant to highways. By doing this, the communication apparatus can prevent the reception of information not relevant to highways while moving by highway, for example, the reception of information regarding railways.

(7) In the first aspect of the present invention, the means of movement determining unit may determine whether or not the means of movement is movement by railway and the position measurement result transmission determining unit may determine not to transmit the position measurement result by the position measuring unit to the information-providing apparatuses that transmits information not relevant to the railway in the case in which the means of movement determining unit determines movement by railway.

According to the above-noted constitution, in the communication system, in the case in which the determination is made that movement is by railway, the communication apparatus make the determination not to transmit a position measurement result to an information-providing apparatus that transmits information not relevant to railways. By doing this, the communication apparatus can prevent the reception of information not relevant to railways during movement by train, for example, the reception of information regarding roads.

(8) In the first aspect of the present invention, the communication apparatus may include a speed detecting unit that detects the speed of movement and the means of movement determining unit may determine the means of movement based on its own speed of movement.

According to the above-noted constitution, in the communication system, because the determination of the means of movement is made by the communication apparatus based on speed of movement, for example, when moving at a low speed such as when the holder of the communication apparatus is walking, it is possible to prevent the reception of road information and the like that would be necessary in the case of moving on a highway in a vehicle.

(9) A second aspect of the present invention is a communication apparatus transmitting a position measurement result to an information-providing apparatus and receiving information regarding the area selected based on the position measurement result from the information-providing apparatus, the communication apparatus including: a position measuring unit that measures a position; a means of movement determining unit that determining a means of movement; a position measurement result transmission determining unit that determines, based on the means of movement determined by the means of movement determining unit, whether or not to transmit the position measurement result of the position measuring unit to the information-providing apparatus; and a transmitting unit that, in the case in which the position measurement result transmission determining unit determines to transmit the position measurement result to the information-providing apparatus, transmits the position measurement result to the information-providing apparatus.

(10) A third aspect of the present invention is a communication method in a communication apparatus transmitting a position measurement result to an information-providing apparatus and receiving information regarding the area selected based on the position measurement result from the information-providing apparatus, the communication method including: a first step which measures a position; a second step which determines a means of movement; a third step which determines, based on the means of movement determined in the second step, whether or not to transmit the position measurement result in the first step to the information-providing apparatus; and a fourth step which transmits the position measurement result to the information-providing apparatus, in the case in which at the third step the position measurement result is determined to be transmitted to the information-providing apparatus.

(11) A fourth aspect of the present invention is a communication program to cause a computer of a communication apparatus transmitting a position measurement result to an information-providing apparatus and receiving information regarding the area selected based on the position measurement result from the information-providing apparatus to function as: position measuring means which measure a position; movement means determining means which determine a means of movement; position measurement result transmission determining means which determine, based on the means of movement determined by the movement means determining means, whether or not to transmit the position measurement result in the position measuring means to the information-providing apparatus; and transmitting means which transmits the position measurement result to the information-providing apparatus, in the case in which at the position measurement result transmission determining means the position measurement result is determined to be transmitted to the information-providing apparatus.

Effects of the Invention

According to the present invention, it is possible to prevent the reception by a communication apparatus of information unnecessary to the user.

BRIEF DESCRIPTION OF THE DRAWINGS

FIG. 3 is a simplified drawing showing an example of the transmission determination information table according the same embodiment.

FIG. 7 is a simplified drawing showing an example of the speed determination information table according to the same embodiment.

FIG. 8 is a simplified drawing showing an example of the transmission determination information table according to the same embodiment.

BEST MODE FOR CARRYING OUT THE INVENTION

First Embodiment

Figure 1:
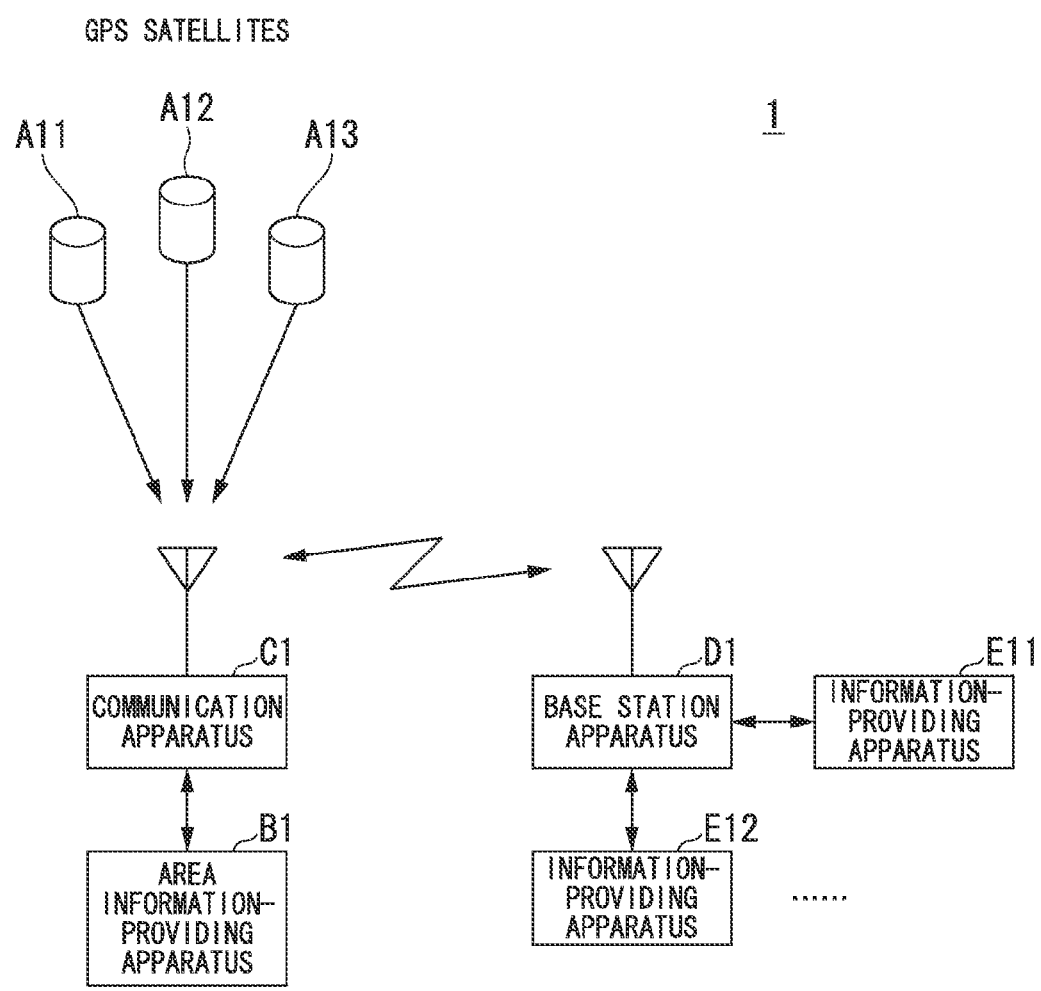
FIG. 1 is a simplified drawing of a communication system according to a first embodiment of the present invention.

An embodiment of the present invention is described below, with references made to the drawings.
<Communication System 1>
FIG. 1 is a simplified drawing of a communication system 1 according to the first embodiment of the present invention.

The communication system 1 has GPS satellites A11 to A13, an area information-providing apparatus B1, a communication apparatus C1, a base station apparatus D1, and information-providing apparatuses E11, E12, and so forth.

The GPS satellites A11 to A13 transmit signals that include time information, satellite orbit information, and the like.

The area information-providing apparatus B1 is a gate apparatus installed at an entrance or an exit to a mode of transportation (for example, a highway or railway), such as an automatic ticket gate. The area information-providing apparatus B1 is, for example, an ETC vehicle-borne (Electronic Toll Collecting System) apparatus or a car navigation apparatus that measures its own position information, using the GPS function.

The area information-providing apparatus B1 transmits to the communication apparatus C1 exit/entry information indicating that the communication apparatus C1 has passed through an automatic ticket gate or ETC system.

The communication apparatus C1 is, for example, a mobile telephone. The communication apparatus C1 may have a GPS function for navigation or the like. The communication apparatus C1, based on signals received from the GPS satellites A11 to A13, periodically performs measurement of its own current position. The communication apparatus C1, based on information received from an area information-providing apparatus B1, determines the mode of transportation (means of movement) that the user carrying it or it itself is aboard. The communication apparatus C1, based on the decided information indicating the mode of transportation (means of movement), selects from the information-providing apparatuses E11, E12, and so forth. The communication apparatus C1 transmits to the base station apparatus D1 the position measurement result, addressed to the selected information-providing apparatus E11, E12, and so forth.

The communication apparatus C1 receives and displays information regarding an area from the information-providing apparatuses E11, E12, and so forth that were the addressees of the position measurement result, via the base station apparatus D1.

Figure 2:
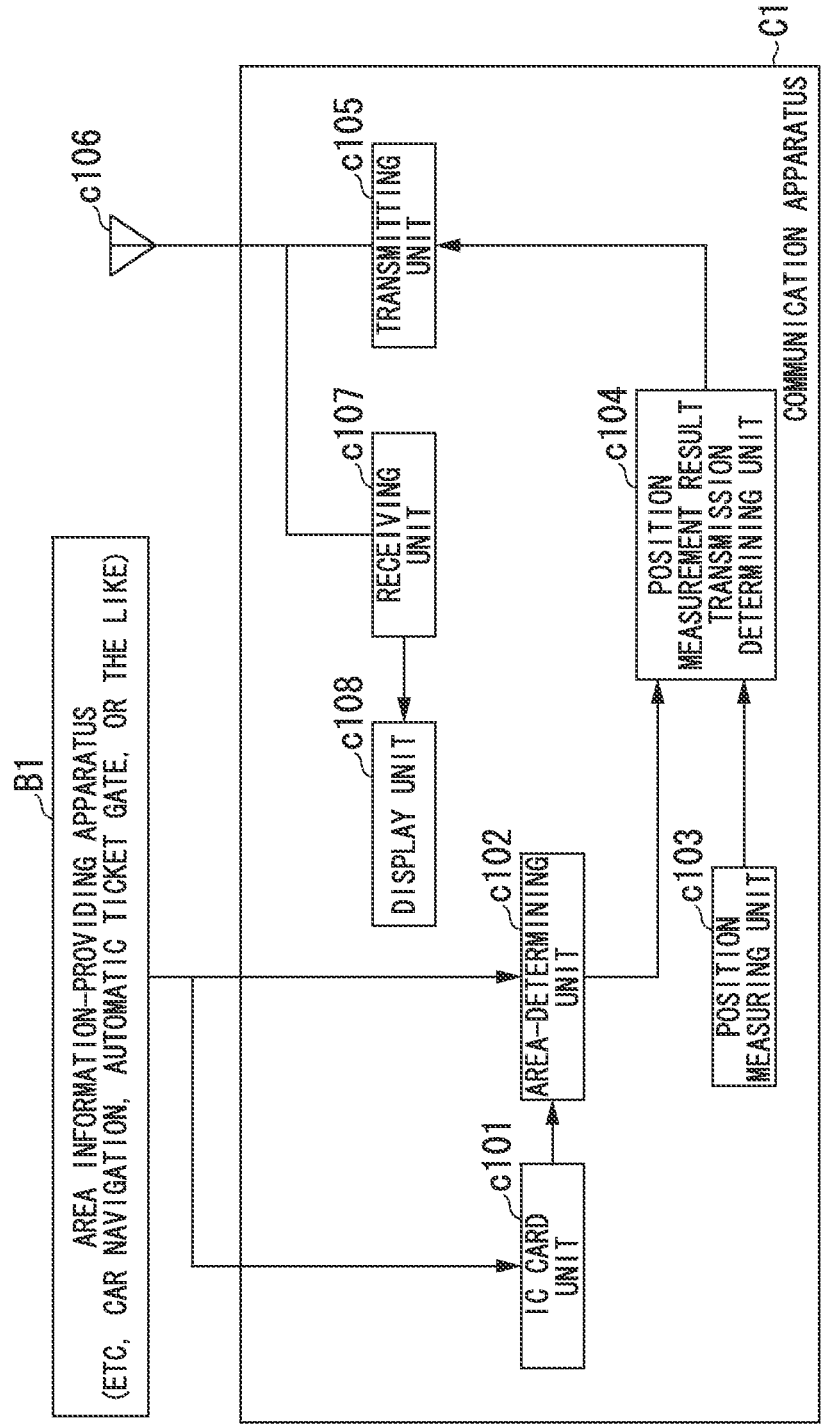
FIG. 2 is a simplified block diagram showing the constitution of a communication apparatus according to the present same embodiment.

The information-providing apparatuses E11, E12, and so forth receive the position measurement result via the base station apparatus D1 and determine whether or not the position of the communication apparatus C1 indicated by the received position measurement result is within an area for which information is provided. If the determination is made that it is within an area for which information is provided, the information-providing apparatuses E11, E12, and so forth transmit information regarding the area (tourist area information, shop information, traffic information, and the like) as information addressed to the communication apparatus C1, to the base station apparatus D1. In this case, the traffic information is, for example, train operation conditions or congestion information in the direction of movement.
<Constitution of the Communication Apparatus C1>
FIG. 2 is a simplified block diagram showing the constitution of the communication apparatus C1 according to the present embodiment. In this drawing, the communication apparatus C1 is constituted to include an IC (integrated circuit) card unit c101, an area-determining unit c102, a position measuring unit c103, a position measurement result transmission determining unit c104, a transmitting unit c105, an antenna c106, a receiving unit c107, and a display unit c108.

The IC card unit c101 has a wireless communication function, and receives from the area information-providing apparatus B1 exit/entry information that indicates that the communication apparatus C1 passes by an area information-providing apparatus B1 (automatic ticket gate apparatus). The IC card unit c101, based on the received exit/entry information, performs payment processing. The IC card unit c101 outputs the received exit/entry information to the area-determining unit c102.

The area-determining unit c102 (means of movement determining unit), based on exit/entry information input from the IC card unit c101, detects a specific area to which the communication apparatus C1 belongs, for example, a movement area on a railway or a movement area on a highway.

The area-determining unit c102, based on the exit/entry information received from the area information-providing apparatus B1 (ETC vehicle-borne apparatus) detects a particular area in which the area information-providing apparatus B1 resides. In this case, information indicating whether the communication apparatus C1 has entered a mode of transportation or exited a mode of transportation is included in the exit/entry information.

The area-determining unit c102, based on the position information received from the area information-providing apparatus B1 (navigation apparatus), detects a particular area in which the area information-providing apparatus B1 resides.

The area-determining unit c102 stores the information of the area in which the detected communication apparatus C1 or area information-providing apparatus B1 (resident area information) resides.

The position measuring unit c103, based on information received from the GPS satellites A11 to A13, measures the position of the communication apparatus C1. The position measuring unit c103 outputs the position measurement result to the position measurement result transmission determining unit c104.

The position measurement result transmission determining unit c104 stores transmission determination information (FIG. 3) ahead of time. The position measurement result transmission determining unit c104, upon input of the position measurement result from the position measuring unit c103, reads out the resident area information stored by the area-determining unit c102. The position measurement result transmission determining unit c104, based on the read-out resident area information and the transmission determination information stored ahead of time, selects the information-providing apparatuses E11, E12, and so forth for reception of information providing services. The position measurement result transmission determining unit c104 outputs the position measurement result input from the position measuring unit c103 to the transmitting unit c105, as information addressed to the selected information-providing apparatuses E11, E12, and so forth.

In the case in which the position measurement result transmission determining unit c104 does not select any of the information-providing apparatuses E11, E12, and so forth, that is, in the case in which the determination is made not to receive any of the information-providing services, the position measurement result transmission determining unit c104 does not output the position measurement result to the transmitting unit c105.

The transmitting unit c105, transmits the position measurement result input from the position measurement result transmission determining unit c104 to the base station apparatus D1, via the antenna c106.

The receiving unit c107 receives information regarding the area from the information-providing apparatuses E11, E12, and so forth which were made the addressees for the position measurement result, via the base station apparatus D1 and the antenna c106. The receiving unit c107 outputs the received information regarding the area to the display unit c108.

The display unit c108 displays the information regarding the area that was input from the receiving unit c107.

FIG. 3 is a simplified drawing showing an example of a transmission determination information table according to the present embodiment. This transmission determination information table is a table that is stored by the position measurement result transmission determining unit c104.

As shown in the drawing, the transmission determination information table has columns for each of the items of service, information-providing apparatus, STR (Station) flag, and ICR (interchange) flag. In this case, service is the type of information service (for example information for a railway passenger, information for a road user, information for a bus passenger). The STR flag indicates, in the case of residing in a movement area of a railway, whether or not to transmit position measurement result, and the ICR flag indicates, in the case of residing in a movement area of a highway, whether or not to transmit position measurement result (0 meaning transmit and 1 meaning do not transmit).

The transmission determination information table is a two-dimensional table having rows and columns, in which transmission determination information is stored for each service. Of the transmission determination information, the STR flag and the ICR flag may be selected ahead of time by the user of the communication apparatus C1, and may be stored as the flags that are set ahead of time by the provider of an information-providing service.

For example, the example of FIG. 3, in the case in which the resident area information stored by the area-determining unit c102 of FIG. 2 indicates residence in the movement area of a railway (ST=1), the indication is that it is possible to receive information provided for services B, D, and E, for which the STR flag is 0. Also, this drawing indicates in this case that the position measurement result transmission determining unit c104 selects information-providing apparatuses E12, E14, and E15, and outputs the position measurement result to the transmitting unit c105, with the information-providing apparatuses E12, E14, and E15 as the addressees.

Also, for example, in the example of FIG. 3, in the case in which the resident area information stored by the area-determining unit c102 indicates residence in the movement area of a highway (IC=1), the indication is that it is possible to receive information provided for the services A, C, D, and E, for which the ICR flag is 0. This drawing also indicates that the position measurement result transmission determining unit c104 selects the information-providing apparatuses E11, E13, E14, and E15 and outputs the position measurement result to the transmitting unit c105, with the information-providing apparatuses E11, E13, E14, and E15 as the addressees.

<Operation of the Communication Apparatus C1>

Figure 4:
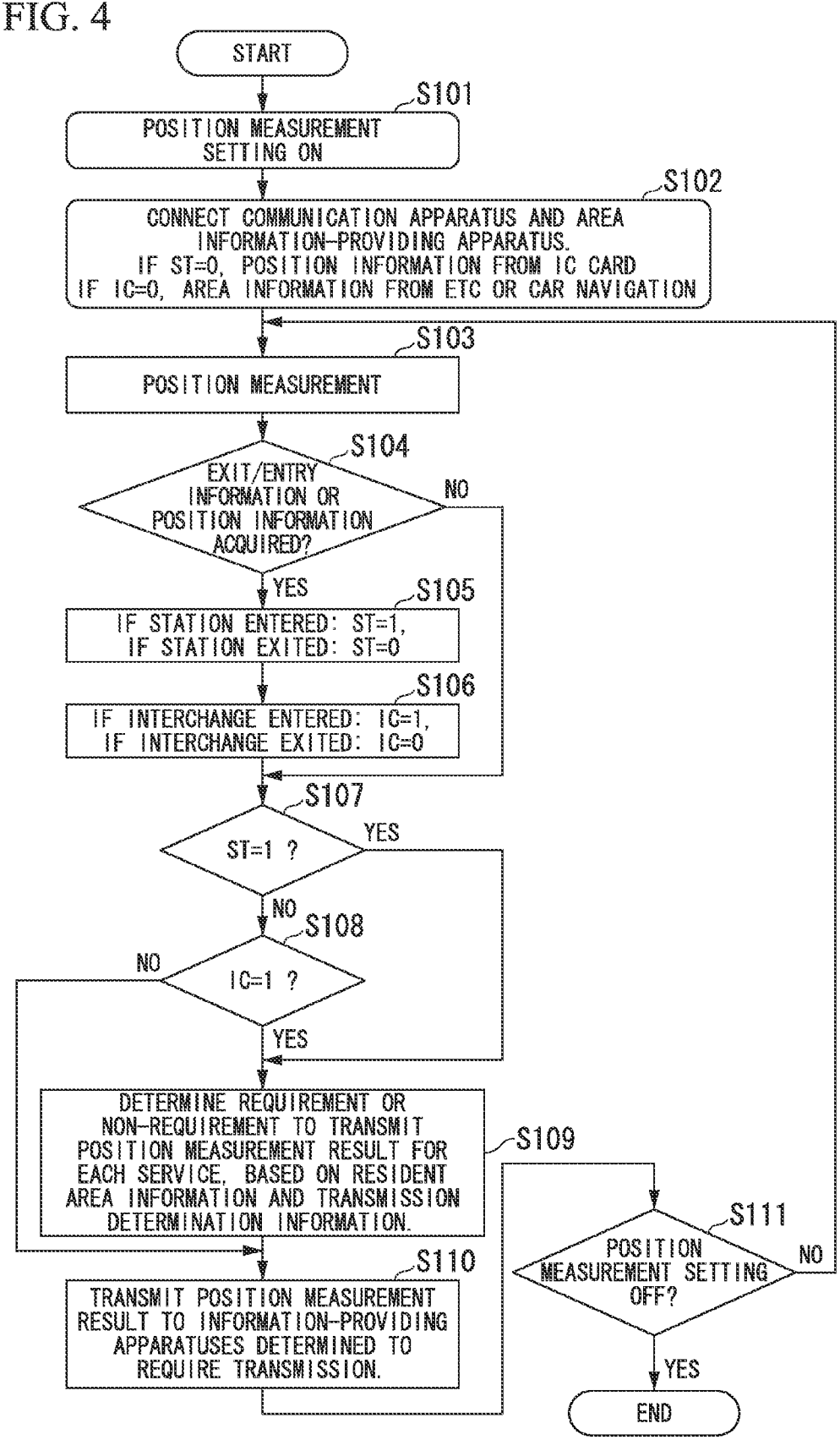
FIG. 4 is a flowchart showing the operation of the communication apparatus according to the same embodiment.

FIG. 4 is a flowchart showing the operation of the communication apparatus C1 of the present embodiment. FIG. 4 will be described below, with references made to FIG. 2.

(Step S101) The position measurement setting is set to ON. This setting may be made by a user operation, and may be made as an initialization. Once the position measurement setting is made, the same setting is maintained even when the communication apparatus C1 is subsequently started. After this, processing proceeds to step S102.

(Step S102) The communication apparatus C1 connects with the area information-providing apparatus B1 (for example, a car navigation or ETC vehicle-borne apparatus). In the case in which the area information-providing apparatus B1 is an automatic ticket gate apparatus, a connection is made for a short time by touching (contact) between the communication apparatus C1 and the area information-providing apparatus B1.

The area-determining unit c103 of the communication apparatus C1 sets the resident area information to 0 (ST=0, IC=0) as the initial setting. This initial setting may be established as a value selected by a user. After this, processing proceeds to step S103.

(Step S103) The position measuring unit c103 measures the position. After that, processing proceeds to step S104.

(Step S104) The area-determining unit c102 determines whether or not the exit/entry information or position information has been acquired. In the case of a determination by the area-determining unit c102 that the exit/entry information or position information has been acquired (YES), processing proceeds to step S105. In the case, however, in which the determination is that the exit/entry information or position information has not been acquired (NO), processing proceeds to step S107.

(Step S105) In the case in which the exit/entry information input from the IC card unit c101 indicates entry, the area-determining unit c102 stores resident area information indicating residence in the movement area of a railway (ST=1). In the case, however, in which the exit/entry information indicates exit, the area-determining unit c102 stores resident area information (ST=0) indicating non-residence in the movement area of a railway.

In the case in which the position information input from the area information-providing apparatus B1 (navigation apparatus) is positioned in a movement area of a railway, on a line or at a station, the area-determining unit c102 stores resident area information (ST=1) indicating residence in the movement area of a railway. In the case, however, of not being resident in the movement area of a railway, the area-determining unit c102 stores resident area information (ST=0) indicating non-residence in the movement area of a railway. After this, processing proceeds to step S106.

(Step S106) In the case in which the exit/entry information input from the area information-providing apparatus B1 (ETC vehicle-borne apparatus) indicates entry, the area-determining unit c102 stores resident area information (IC=1) indicating residence in the movement area of a highway. In the case, however, of the exit/entry information indicating exit, the area-determining unit c102 stores resident area information (IC=0) indicating non-residence in the movement area of a highway.

In the case in which position information input from the area information-providing apparatus B1 (navigation apparatus) indicates positioning in the movement area on a highway, at a toll gate, in a parking area, or at a service area or the like, the area-determining unit c102 stores resident area information (IC=1) indicating residence in the movement area of a highway. In the case, however, in which positioning is not in the movement area of a highway, the area-determining unit c102 stores resident area information (IC=0) indicating non-residence in the movement area of a highway. After this, processing proceeds to step S107.

(Step S107) The position measurement result transmission determining unit c104 determines whether or not the resident area information stored by the area-determining unit c102 indicates residence in the movement area of a railway (ST=1). In the case of residence in the movement area of a railway (YES), processing proceeds to step S109. However, in the case indicating non-residence in the movement area of a railway (NO), processing proceeds to step S110.

(Step S108) The position measurement result transmission determining unit c104 determines whether or not the resident area information stored by the area-determining unit c102 indicates residence in the movement area of a highway (IC=1). In the case of indicating residence in the movement area of a highway (YES), processing proceeds to step S109. In the case, however, indicating non-residence in the movement area of a highway (NO), processing proceeds to step S108.

(Step S109) The position measurement result transmission determining unit c104, based on the latest resident area information stored at steps S102, S105, and S106 and the transmission determination information stored ahead of time (FIG. 3), determines whether or not to transmit position measurement result, for each transmission determination information, that is, for each service. Specifically, in the case in which the resident area information indicates residence in the movement area of a railway (ST=1), the position measurement result transmission determining unit c104 determines to transmit (transmission required) the position measurement result to information-providing apparatuses providing information of the services for which the STR flag is 0.

In the case in which the resident area information indicates residence in the movement area of a highway (IC=1), the position measurement result transmission determining unit c104 determines to transmit (transmission required) the position measurement result to the information-providing apparatuses providing information of the services for which the ICR flag is 0.

For apparatuses other than an information-providing apparatus for which the position measurement result transmission determining unit c104 determines to transmit position measurement result, the determination is not to transmit position measurement result (transmission not required). After that, processing proceeds to step S110.

(Step S110) The communication apparatus C1 transmits position measurement result to the information-providing apparatuses that were determined at step S109 to require transmission (transmission required). In the case in which the determination is not made at step S109 (the case of NO at the determination of step S108), the communication apparatus C1 transmits the position measurement result to all of the information-providing apparatuses in the transmission determination information table. After that, processing proceeds to step S111.

(Step S111) The communication apparatus C1 determines whether or not the position measurement stetting is OFF. In the case in which the determination is that the position measurement setting is not OFF (NO), the communication apparatus C1 returns to step S103. In the case of a determination that the position measurement setting is OFF (YES), the communication apparatus C1 ends its operation.

In this manner, according to the present embodiment, in the communication system 1, because the communication apparatus C1 determines whether or not to transmit position measurement result to the information-providing apparatuses E11, E12, and so forth based on the mode of transportation, it is possible to prevent the transmission of position measurement result to the information-providing apparatuses E11, E12, and so forth that transmit information that is not relevant to the mode of transportation. By doing this, it is possible to prevent the communication apparatus C1 from receiving information not relevant to the mode of transportation from the information-providing apparatuses E11, E12, and so forth, that is, to prevent the reception of information unnecessary to the user. Also, by preventing such reception, the communication apparatus C1 can prevent electrical power consumption required in reception, and prevent the consumption of storage area to store the received data.

According to the present embodiment, in the communication system 1, because the communication apparatus C1 determines the mode of transportation based on information indicating exit and entry received from a gate apparatus, it is possible to reliably determine the mode of transportation.

Also, according to the present embodiment, in the communication system 1, in the case of a determination of moving on a highway, a determination is made by the communication apparatus not to transmit position measurement result to the information-providing apparatuses E11, E12, and so forth that transmit information not relevant to a highway. By doing this, the communication apparatus C1 can prevent the reception of information not relevant to a highway while moving on a highway, for example, information regarding a railway.

Also, according to the present embodiment, in the communication system 1, in the case of a determination of moving on a railway, a determination is made by the communication apparatus not to transmit position measurement result to information-providing apparatuses E11, E12, and so forth that transmit information not relevant to a railway. By doing this, the communication apparatus can prevent reception of information not relevant to a railway while moving on a railway, for example, reception of information regarding a highway.

Second Embodiment

A second embodiment of the present invention will be described in detail below, with references made to the drawings.

In the above-described first embodiment, the description was for the case in which the communication apparatus C1 determines the information-providing apparatuses to which position measurement result is to be transmitted, based on resident area information. In the present embodiment, the case in which the communication apparatus, based on its own speed of movement, determines the information-providing apparatuses to which position measurement result is to be transmitted will be described.

<Communication System 2>

Figure 5:
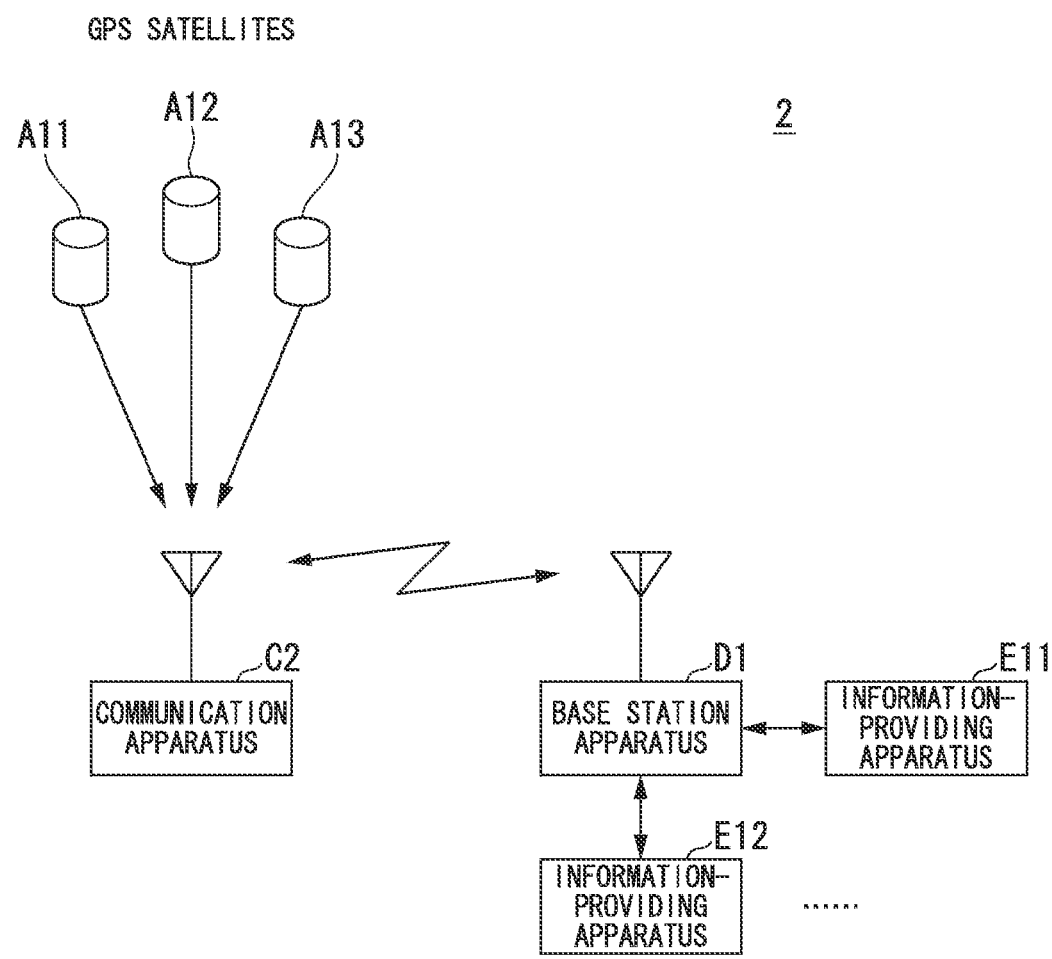
FIG. 5 is a simplified drawing showing a communication system according to a second embodiment of the present invention.

FIG. 5 is a simplified drawing of the communication system 2 of the second embodiment of the present invention.

Comparing the communication system 2 (FIG. 5) of the present embodiment with the communication system 1 (FIG. 1) of the first embodiment, the communication system 2 is different with regard to the point of not having an area information-providing apparatus B1, and the point of having a communication apparatus C2 instead of the communication apparatus C1. However, the constitutions and functions of the other apparatuses (the GPS satellites A11 to A13, the base station apparatus D1, and the information-providing apparatuses E11, E12, and so forth) are the same as in the first embodiment. The descriptions of the apparatuses that are the same as in the first embodiment are omitted herein.

<Constitution of the Communication Apparatus 2>

Figure 6:
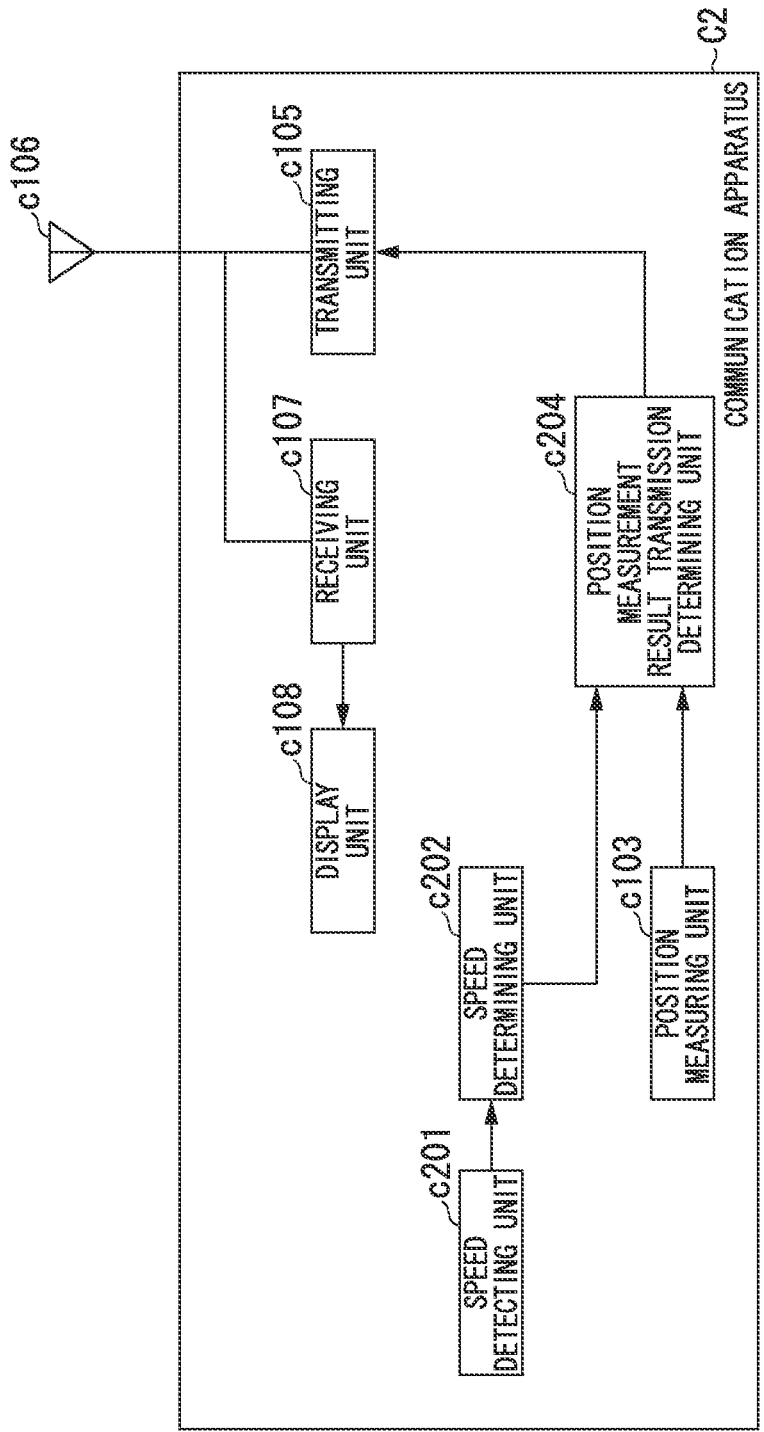
FIG. 6 is a simplified block diagram showing the constitution of the communication system according to the same embodiment.

FIG. 6 is a simplified block diagram showing the constitution of the communication apparatus C2 of the present embodiment. Comparing the communication apparatus C2 (FIG. 6) of the present embodiment with the communication apparatus C1 (FIG. 2) of the first embodiment, the communication apparatus C2 is different with regard to the point of having a speed detecting unit c201 in place of the IC card unit c102, a speed determining unit c202 in place of the area-determining unit c102, and a position measurement result transmission determining unit c204 in place of the position measurement result transmission determining unit c104. However, the constitutions and functions of the other apparatuses (the position measuring unit c103, the transmitting unit c105, the antenna c106, the receiving unit c107, and the display unit c108) are the same as in the first embodiment. The descriptions of the apparatuses that are the same as in the first embodiment are omitted herein.

The speed detecting unit c201 detects the speed of movement information of the communication apparatus C2. Specifically, the speed detecting unit c201 predicts the maximum Doppler frequency of the received signal from the base station apparatus D1 and detects speed of movement information from the predicted maximum Doppler frequency. The detection processing for the speed of movement is not restricted to this processing and may be, for example, output by the position measuring unit c103 of the position measurement result to the speed detecting unit c201 and detection by the speed detecting unit c201 of the position offset per unit time as the speed of movement information. The speed detecting unit c201 outputs the detected speed of movement information to the speed determining unit c202.

The speed determining unit c202 (means of movement determining unit), based on speed determination information (FIG. 7), classifies the speed of movement information input from the speed detecting unit c201. The speed determining unit c202 stores speed classification information, which is the result of the classification.

The position measurement result transmission determining unit c204 stores transmission determining information (FIG. 8) ahead of time. The position measurement result transmission determining unit c204, upon input of the position measurement result from the position measuring unit c103, reads out the speed classification information stored by the speed determining unit c202. The speed determining unit c202, based on the read-out speed classification information and the speed determination information stored ahead of time, selects the information-providing apparatuses E11, E12, and so forth for information-providing services to be received. The position measurement result transmission determining unit c204 outputs the position measurement result input from the position measuring unit c103 to the transmitting unit c105 as information addressed to the selected information-providing apparatuses E11, E12, and so forth.

In the case in which the position measurement result transmission determining unit c204 selects none of the information-providing apparatuses E11, E12, and so forth, that is, if the determination is to receive no information-providing service, the position measurement result transmission determining unit c204 does not output the position measurement result to the transmitting unit c105.

FIG. 7 is a simplified drawing showing an example of the speed determination information table in the present embodiment. The speed determination information table is a table stored by the speed determining unit c202.

As shown in the drawing, the speed determination information table has rows for the each of the items speed of movement and speed classification. The remarks in FIG. 7 are descriptions of the speed classifications. The speed determination information table is a two-dimensional table having rows and columns, which is stored the speed determination information for each speed of movement.

For example, the first speed determination information from the top in FIG. 7 indicates that, in the case in which the speed of movement detected by the speed detecting unit c201 is "5 km/h or lower," the speed determining unit c202 determines this to be "low speed." In the case of "low speed," as indicated in the remark, it can be thought that the user carrying the communication apparatus C2 is moving by walking (means of movement).

Also, for example, the second speed determination information from the top in FIG. 7 indicates that, in the case in which the speed of movement detected by the speed detecting unit c201 is "6 to 69 km/h," the speed determining unit c202 determines this to be "medium speed." In the case of "medium speed," as indicated in the remark, it can be thought that the user carrying the communication apparatus C2 is moving on general roads in a car or riding a train (with the exception of the Shinkansen or a limited express).

Also, for example, the third speed determination information from the top in FIG. 7 indicates that, in the case in which the speed of movement detected by the speed detecting unit c201 is "70 km/h or higher," the speed determining unit c202 determines this to be "high speed." In the case of "high speed," as indicated in the remarks, it can be thought that the user carrying the communication apparatus C2 is moving by car on a highway or riding on a train (Shinkansen or limited express).

FIG. 8 is a simplified drawing showing an example of the transmission determination information table in the present embodiment. The transmission determination information table is a table stored by the position measurement result transmission determining unit c204.

As shown in the drawing, the transmission determination information table has columns for each of the items service, information-providing apparatus, and speed classification. The remarks in FIG. 8 are descriptions of service. The transmission determination information table is a two-dimensional table having rows and columns, which is stored the transmission determination information for each service.

For example, the first transmission determination information from the top in FIG. 8 indicates that, in the case in which the speed classification information stored by the speed determining unit c202 of FIG. 6 is "low speed," the information-providing services A, B, and C, which have the speed classification "low speed," are received. As indicated by the remark, the services A, B, and C provide information for users who are walking (for example, information regarding walking courses, cafes, and rest spots in that area).

For example, the fourth transmission determination information from the top in FIG. 8 indicates that, in the case in which the speed classification information stored by the speed determining unit c202 is "medium speed," the information-providing service D, which has the speed classification "medium speed," is received. As indicated by the remark, the service D provides information for users who are moving by train (except for the Shinkansen or a limited express) (for example, information regarding stations and tourist information, nearby stations, and information about railway boxed meals, guides about train transfers and in-station shops).

Also, for example, the fifth transmission determination information from the top in FIG. 8 indicates that, in the case in which the speed determination information stored by the speed determining unit c202 is "high speed," the information-providing service E, which has the speed classification "high speed," is received. As indicated by the remark, the service E provides information for users moving by highway (for example, information about tourism nearby interchanges, parking areas, service areas and construction).

<Operation of the Communication Apparatus C2>

Figure 9:
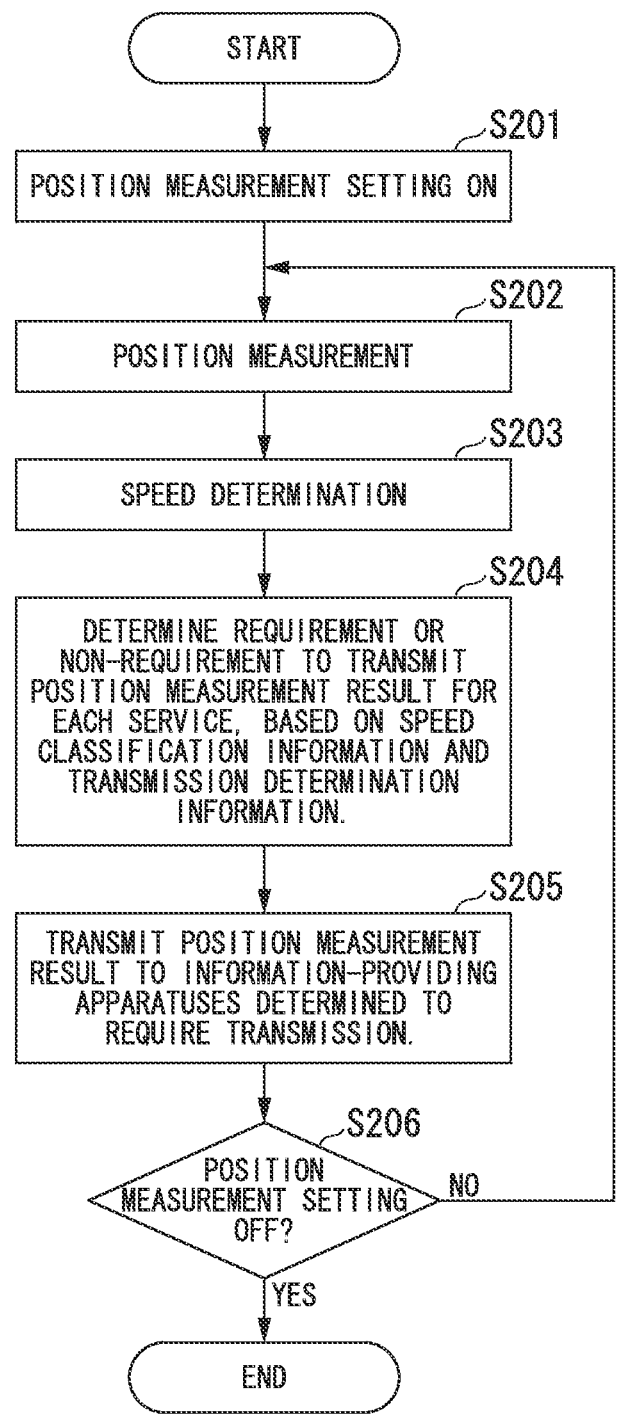
FIG. 9 is a flowchart showing the operation of the communication apparatus according to the same embodiment.

FIG. 9 is a flowchart of the operation of the communication apparatus C2 in the present embodiment. FIG. 9 will be described below, with references made to FIG. 6.

(Step S201) The position measurement setting is set to ON. After that, processing proceeds to step S203.

(Step S202) The position measuring unit c103 performs position measurement. After that, processing proceeds to step S203.

(Step S203) The speed determining unit c202 classifies the speed of movement information detected by the speed detecting unit c201, and stores the speed classification information that is the result of the classification.

(Step S204) The position measurement result transmission determining unit c204, based on the speed classification information stored at step S203 and the transmission determination information (FIG. 8) stored ahead of time, determines whether or not to transmit the position measurement result for each transmission determination information, that is, for each service. Specifically, in the example of FIG. 8, in the case in which the speed classification information stored at step S203 is "low speed," the position measurement result transmission determination unit c204 determines to transmit (transmission required) position measurement result to information-providing apparatuses of services A, B, and C, for which the speed classification is "low speed." Also, in the case in which the speed classification information stored at step S203 is "medium speed," the position measurement result transmission determination unit c204 determines to transmit (transmission required) the position measurement result to the information-providing apparatus of service D, for which the speed classification is "medium speed." Also, in the case in which the speed classification information stored at step S203 is "high speed," the position measurement result transmission determination unit c204 determines to transmit (transmission required) the position measurement result to the information-providing apparatus of service E, for which the speed classification is "high speed." After that, processing proceeds to step S205.

(Step S205) The communication apparatus C1 transmits the position measurement result to information-providing apparatuses to determine the requirement to transmit at step S109 (transmission required). After that, processing proceeds to step S206.

(Step S206) The communication apparatus C1 determines whether or not the position measurement setting is OFF. In the case of a determination that the position measurement setting is not OFF (NO), the communication apparatus C1 returns to step S202. In the case of a determination that the position measurement setting is OFF (YES), the communication apparatus C1 ends its operation.

In this manner, according to the present embodiment, in the communication system 2, because the communication apparatus C2 determines the mode of transportation based on the speed of movement, when, for example, the holder of the communication apparatus C2 is moving at a low speed such as by walking, it is possible to prevent the reception of road information required in the case of moving by car at high speed.

A part of the communication apparatuses C1, C2 of the above-described embodiments, for example, the area-determining unit c102 and the position measurement result transmission determining units c104, c204 may be implemented by a computer. In this case, a program for implementing these control functions may be stored in a computer-readable recording medium, a computer being caused to read in and execute the program stored in the recording medium, so as to implement the functions. The term "computer system" is a computer system built into the communication apparatuses C1, C2 and includes operating systems and hardware, such as peripheral devices. The term "computer-readable recording medium" refers to a portable medium, such as a flexible disk, an optical magnetic disc, a ROM, and a CD-ROM, and a storage device, such as a hard disk that is built into a computer system. The term "computer-readable medium" may include something that dynamically retains a program for a short time, for example, a communication line in the case in which the program is transmitted via a network such as the Internet, a telephone communication line, or the like, as well as a medium to retain a program for a given time, for example, a volatile memory internally provided in a computer system acting as the server and client in that communication. The program may have the purpose of implementing a part of the above-described function, and it may also implement the above-described function in combination with a program already recorded in a computer system.

Although embodiments of the present invention are described in detail above, with references to the drawings, there is no restriction to the specific constitutions described above, and the present invention can be subjected to various design changes within the scope of the essence of the present invention.

INDUSTRIAL APPLICABILITY

The present invention is suitable for use in a communication system and a communication apparatus, and is capable of preventing reception by a communication apparatus of information that is unnecessary to the user.

REFERENCE SYMBOLS

A11 to A13: GPS satellite
B1: Area information-providing apparatus
C1, C2: Communication apparatus
D1: Base station apparatus
E11, E12: Information-providing apparatus
c101: IC card unit
c102: Area-determining unit (means of movement determining unit)
c103: Position measuring unit
c104, c204: Position measurement result transmission determining unit
c105: Transmitting unit
c106: Antenna
c107: Receiving unit
c108: Display unit
c201: Speed detecting unit
c202: Speed determining unit (means of movement determining unit)

The invention claimed is:

1. A communication system comprising a communication apparatus that transmits a position measurement result, and an information-providing apparatus that selects and transmits to the communication apparatus information regarding an area based on the position measurement result received from the communication apparatus, wherein
the communication apparatus comprises:
a position measuring unit configured to measure a position of the communication apparatus;
a means of movement determining unit configured to determine a means of movement which is being used to move the communication apparatus;
a position measurement result transmission determining unit configured to determine, based on the means of movement determined by the means of movement determining unit, whether or not to transmit the position measurement result of the position measuring unit to the information-providing apparatus; and
a transmitting unit configured to transmit, in the case in which the position measurement result transmission determining unit determines to transmit the position measurement result to the information-providing apparatus, the position measurement result to the information-providing apparatus.

2. The communication system according to claim 1, wherein the position measurement result transmission determining unit is configured to determine not to transmit the position measurement result to the information-providing apparatus that transmits information not relevant to the means of movement determined by the means of movement determining unit.

3. The communication system according to claim 1, wherein the means of movement determining unit is configured to determine the means of movement based on its own position area.

4. The communication system according to claim 3, wherein the communication system comprises a navigation apparatus configured to measure the position and the means of movement determining unit is configured to determine the means of movement based on the position information input from the navigation apparatus.

5. The communication system according to claim 1, wherein the communication system comprises a gate apparatus configured to control exit and entry of the means of movement, and
the means of movement determining unit is configured to determine the means of movement based on information showing entry and exit received from the gate apparatus.

6. The communication system according to claim 1, wherein the means of movement determining unit is configured to determine whether or not the means of movement is moving on a highway and
the position measurement result transmission determining unit is configured to determine not to transmit the position measurement result by the position measuring unit to a first information-providing apparatus that transmits information not relevant to the highway in the case in which the means of movement determining unit determines movement to be by highway.

7. The communication system according to claim 1, wherein the means of movement determining unit is configured to determine whether or not the means of movement is movement by railway and
the position measurement result transmission determining unit is configured to determine not to transmit the position measurement result by the position measuring unit to a first information-providing apparatus that transmits information not relevant to the railway in the case in which the means of movement determining unit determines movement by railway.

8. The communication system according to claim 1, wherein the communication apparatus comprises a speed detecting unit configured to detect the speed of movement and
the means of movement determining unit is configured to determine the means of movement based on its own speed of movement.

9. A communication apparatus transmitting a position measurement result to an information-providing apparatus and receiving information regarding the area selected based on the position measurement result from the information-providing apparatus, the communication apparatus comprising:
a position measuring unit configured to measure a position of the communication apparatus;
a means of movement determining unit configured to determine a means of movement which is being used to move the communication apparatus;
a position measurement result transmission determining unit configured to determine, based on the means of movement determined by the means of movement determining unit, whether or not to transmit the position measurement result of the position measuring unit to the information-providing apparatus; and
a transmitting unit configured to transmit, in the case in which the position measurement result transmission determining unit determines to transmit the position measurement result to the information-providing apparatus, the position measurement result to the information-providing apparatus.

10. A communication method in a communication apparatus transmitting a position measurement result to an information-providing apparatus and receiving information regarding the area selected based on the position measurement result from the information-providing apparatus, the communication method comprising:

measuring a position of the communication apparatus;
determining a means of movement which is being used to move the communication apparatus;
determining, based on the determined means of movement, whether or not to transmit the position measurement result to the information-providing apparatus; and
transmitting the position measurement result to the information-providing apparatus, in the case in which the position measurement result is determined to be transmitted to the information-providing apparatus.

11. A non-transitory computer-readable recording medium storing a communication program to cause a computer of a communication apparatus transmitting a position measurement result to an information-providing apparatus and receiving information regarding the area selected based on the position measurement result from the information-providing apparatus, the communication program making the computer cause:
measuring a position of the communication apparatus;
determining a means of movement which is being used to move the communication apparatus;
determining, based on the determined means of movement, whether or not to transmit the position measurement result to the information-providing apparatus; and
transmitting the position measurement result to the information-providing apparatus, in the case in which the position measurement result is determined to be transmitted to the information-providing apparatus.

12. The communication system according to claim 2, wherein the means of movement determining unit is configured to determine the means of movement based on its own position area.

13. The communication system according to claim 2, wherein the communication system comprises a gate apparatus configured to control exit and entry of the means of movement, and
the means of movement determining unit is configured to determine the means of movement based on information showing entry and exit received from the gate apparatus.

14. The communication system according to claim 3, wherein the communication system comprises a gate apparatus configured to control exit and entry of the means of movement, and
the means of movement determining unit is configured to determine the means of movement based on information showing entry and exit received from the gate apparatus.

15. The communication system according to claim 2, wherein the means of movement determining unit is configured to determine whether or not the means of movement is moving on a highway and
the position measurement result transmission determining unit is configured to determine not to transmit the position measurement result by the position measuring unit to a first information-providing apparatus that transmits information not relevant to the highway in the case in which the means of movement determining unit determines movement to be by highway.

16. The communication system according to claim 3, wherein the means of movement determining unit is configured to determine whether or not the means of movement is moving on a highway and
the position measurement result transmission determining unit is configured to determine not to transmit the position measurement result by the position measuring unit to a first information-providing apparatus that transmits information not relevant to the highway in the case in which the means of movement determining unit determines movement to be by highway.

17. The communication system according to claim 6, wherein
the transmitting unit is configured to transmit the position measurement result to a second information-providing apparatus which transmits information relevant to the highway, in case that the means of movement determining unit determines that the means of movement is moving on the highway.

18. The communication system according to claim 17, wherein
the communication apparatus further comprises:
a receiving unit configured to receive, from the second information-providing apparatus, the information relevant to the highway in response to the transmission of the position measurement result by the transmitting unit.

19. The communication system according to claim 7, wherein
the transmitting unit is configured to transmit the position measurement result to a second information-providing apparatus which transmits information relevant to the railway, in case that the means of movement determining unit determines that the means of movement is moving on the railway.

20. The communication system according to claim 19, wherein
the communication apparatus further comprises:
a receiving unit configured to receive, from the second information-providing apparatus, the information relevant to the railway in response to the transmission of the position measurement result by the transmitting unit.

* * * * *